United States Patent [19]

Morley

[11] 4,135,360
[45] Jan. 23, 1979

[54] POSITIONING APPARATUS FOR A TRACK ASSEMBLY MACHINE

[75] Inventor: Roy D. Morley, Peoria, Ill.
[73] Assignee: Caterpillar Tractor Co., Peoria, Ill.
[21] Appl. No.: 875,965
[22] Filed: Feb. 8, 1978
[51] Int. Cl.² .............................................. B21L 9/06
[52] U.S. Cl. ......................................................... 59/7
[58] Field of Search .................. 59/1, 7, 11, 8, 10, 59/12

[56] References Cited

U.S. PATENT DOCUMENTS 3,028,723  4/1962  Kaplan ........................................ 59/7
3,028,724  4/1962  Kaplan ........................................ 59/7

FOREIGN PATENT DOCUMENTS 127567  3/1958  U.S.S.R. ...................................... 59/7

Primary Examiner—C. W. Lanham
Assistant Examiner—Gene P. Crosby
Attorney, Agent, or Firm—John L. James

[57] ABSTRACT

A positioning apparatus initially positions a track chain link and automatically repositions the link in response to forces subjected upon the link by a track assembly machine when forcibly connecting the pin and links to form a track chain.

9 Claims, 2 Drawing Figures

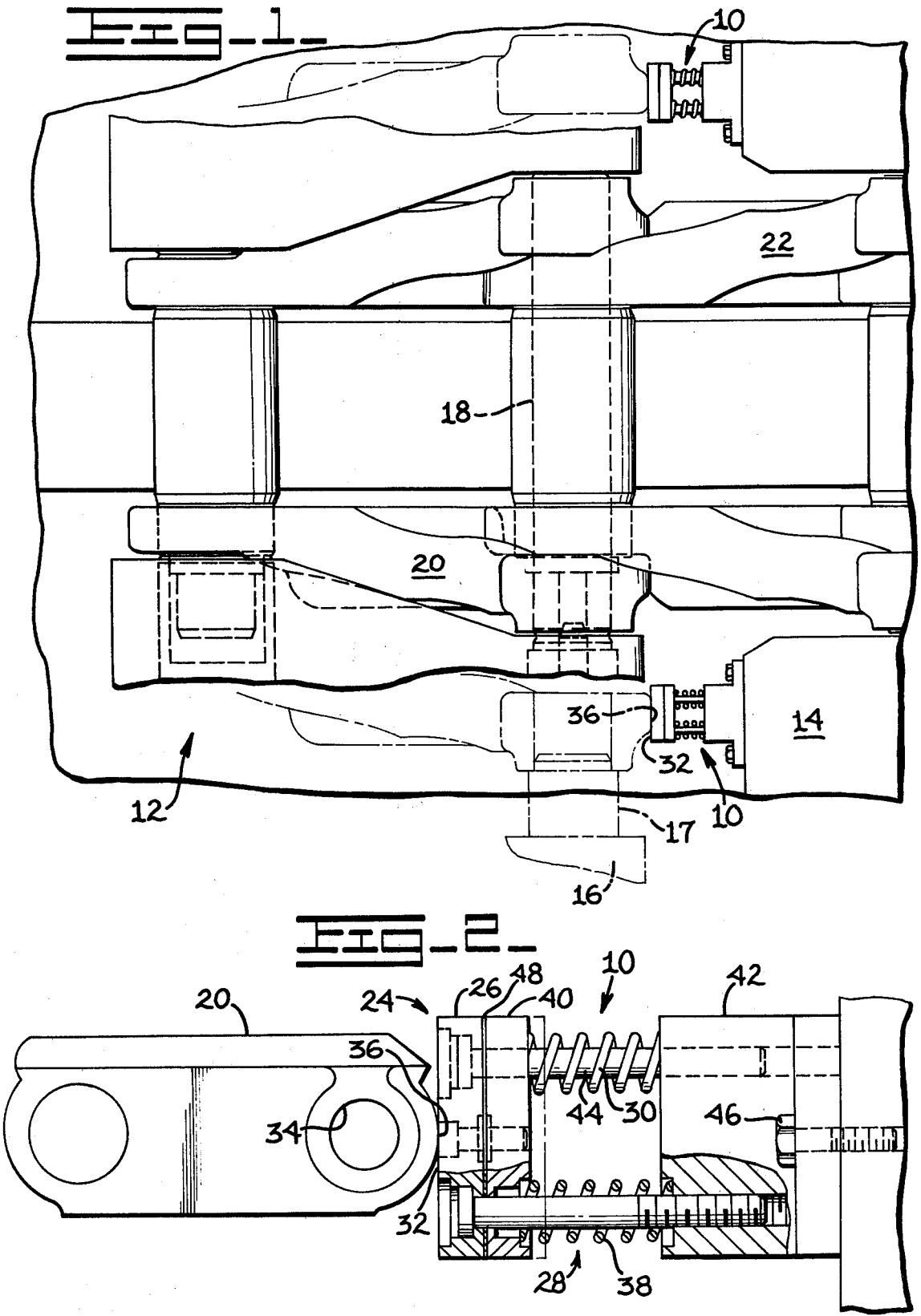

POSITIONING APPARATUS FOR A TRACK ASSEMBLY MACHINE

BACKGROUND OF THE INVENTION

Track-type vehicles move about on track chains composed of a series of interconnected track links which are press fitted onto track pins. The pins are slightly tapered or chamfered on the ends to facilitate pressing the link onto the pin. The pin and link must be aligned within very close tolerances to effect a press fit. A track assembly machine for assembling the track has a press with a press alignment pin which engages the link and aligns the pin and link. The press pin and track pin are prealigned. The track assembly machine automatically shuts down when the pin and link to be press fitted are not properly aligned. The assembly machine must then be manually started after properly aligning the pin and link.

Alignment of the press pin and link is accomplished by using a fixed, rigid stop member to initially position the link. The stop member stops movement of the link along the assembly machine by contacting a nonmachined edge or surface of the link. Because the edge is not machined, alignment is dependent upon the quality and thickness of the edge.

Since the link is forged, many factors, such as the condition of the forging die, influence the quality and thickness of the edge. For example, a worn die produces a thicker edge than a new die. The link does not move forward enough to properly align with the press pin when the edge is too thick. When this happens, a chamfered or tapered end of the press pin abuts the opening in the link and part of the force used to press the link on the pin is transmitted through the press pin to the link. This results in load forces which urge the link forward toward the fixed, rigid stop. Since the link is too far rearward, the press pin does not properly enter the link and the machine automatically shuts down. The press pin and link must thereafter be manually aligned before the assembly can proceed.

Misalignment is minimized by careful inspection of each link. This procedure, however, is extremely time consuming and results in unacceptable links which must be laboriously machined or discarded. It is desirable to have a positioning apparatus which initially positions the link and which automatically, correctly repositions the link when the link and press pin are not properly aligned.

SUMMARY OF THE INVENTION

The present invention is directed to overcoming one or more of the problems as set forth above.

According to the present invention, a positioning apparatus initially positions a track link and automatically repositions the link to a preselected relative location in response to forces subjected upon the link when the link and pin are not properly aligned.

BRIEF DESCRIPTION OF THE DRAWINGS

FIG. 1 is a partial plan view of a track assembly machine incorporating the present invention; and FIG. 2 is a somewhat enlarged side view of the prepositioning apparatus of the present invention.

DETAILED DESCRIPTION

Referring to FIG. 1, a positioning apparatus 10 is provided for a track assembly machine 12. The machine 12 has a frame 14 and a press 16 for forcibly connecting track pins 18 and track links 20 and forming a track chain 22 of the type commonly used on track-type vehicles. The pin 18 is positioned along the frame 14 and the link 20 moves along the frame 14 until stopped by the positioning apparatus 10. A press alignment pin 17 aligns the link 20 with the track pin 18 and the link 20 is then pressed onto the pin 18.

Referring to FIG. 2, the positioning apparatus 10 includes means 24 for initially positioning the link 20 and automatically repositioning the link 20 to a preselected location relative to the track pin 18 in response to forces subjected upon the link 20 by the press 16. The positioning means 24 includes a stop member 26 and repositioning means 28, such as a spring assembly 30.

The stop member 26 has a surface 32 and is preferably connected to the frame 14 at a location sufficient for initially positioning the link 20 prior to connecting the track pin 18 and link 20. The link 20 moves along the frame 14 until the surface 32 of the stop member 26 is contacted. At this position, a link opening 34 is properly aligned with the press pin 17 and track pin 18 only when the link edge 36 has a preselected thickness and quality. Thus, the initial position of the moving link 20 relative to the fixed press and pins 17, 18 is readily achieved with no need for automatically repositioning as long as the preselected thickness and quality of the edge 36 is maintained. The pins 17, 18 are preferably tapered or chamfered to aid alignment and facilitate smooth assembly.

In order to provide smooth assembly throughout a larger range of edge thickness, the automatic repositioning feature is required. The repositioning means 28 automatically repositions the stop member 26 and aligns the press pin 17 and link 20 in response to the forces urging the link 20 against the stop member 26. The press pin 17 and track pin 18 are prealigned and aligning the link 20 with the press pin 17 automatically aligns the link 20 with the track pin 18. The spring assembly 30 contains a spring 38, holding element 40 and a base 42. The base 42 is preferably connected to the holding element 40 by bolts 44 and to the frame 14 by bolts 46. The spring 38 is preferably a coiled spring and each of the bolts 44 is positioned within a spring 38. The stop member 26 is connected to the holding element 40 but spaced therefrom by a spacer 48. The stop member 26 and holding element 40 are preferably interchangeable and of different thicknesses. By this construction, different sizes of pins 18 and links 20 can be assembled by interchanging the stop member 26 and holding element 40 or by changing the thickness of the spacer 48.

The holding element 40 is movable along the bolts 44 toward and from the base 42. The spring 38 urges against the holding element 40 and stop member 26 with a force sufficient for maintaining the initial position of the stop member 26 in response to initial contact of the stop member 26 and link 20.

The stop member 26 is movable toward the base 42 in response to the forces acting upon the surface 32 exceeding a preselected value as shown by broken lines in FIG. 2. One skilled in the art can readily determine the amount to preload the spring 38 once the force urging the link 20 forward is known.

In operation, the link 20 moves along the frame 14 until the excessively thick edge 36 abuts the stop member 26 to initially position the link opening 34 relative to the press pin 17 and track pin 18. The press 16 attempts to press a link 20 onto each end of the pin 18 which is fixed and immobile relative to the links 20. Since the link opening 34 is too far rearward, the link 20 is forced forward against the stop member 26 by the press pin 17 as the link 20 is urged toward the track pin 18. The stop member 26 moves forward in a direction away from the link 20 as the press pin 17 engages the link 20 and aligns the link 20 and track pin 18. Without this movement of the stop member 26, the force exerted by the press 16 would damage the pins 17, 18 of link 20 or the assembly machine 12 would shut down. The stop member moves sufficiently to correct the error of the initial positioning of the link 20.

Thus, the positioning apparatus 10 initially positions the link 20 and automatically repositions the link 20 when the link 20 and track pin 18 are not properly aligned. The positioning apparatus 10 compensates for worn dies and minor manufacturing defects which avoids the waste of time and materials. The positioning apparatus 10 uses a nonmachined link surface for alignment which also avoids the waste of time and cutting tools.

Other aspects, objects and advantages will become apparent from a study of the specification, drawings and appended claims.

The embodiments of the invention in which an exclusive property or privilege is claimed are defined as follows:

1. A positioning apparatus for a track assembly machine for forcibly connecting pins and links and forming a track chain, comprising:
    means for initially positioning the link and automatically repositioning the link to a preselected location relative to a pin in response to forces subjected upon the link by the track assembly machine, said means including
    a stop member positioned at a location sufficient for initially positioning the link prior to connecting the pin and link; and
    a spring positioned at a location sufficient for automatically repositioning the stop member and aligning the pin and link in response to said forces urging the link against the stop member.

2. A positioning apparatus, as set forth in claim 1, wherein said spring urges against the stop member with a force sufficient for maintaining the initial position of the stop member in response to initial contact of the stop member and link.

3. A positioning apparatus for a track assembly machine for forcibly connecting pins and links and forming a track chain, comprising:
    means for initially positioning the links and automatically repositioning the link to a preselected location relative to a pin in response to forces subjected upon the link by the track assembly machine, said means including
    a stop member having a surface, said stop member being movable in a preselected direction in response to said forces acting upon the surface of the stop member exceeding a preselected value; and
    a spring assembly having a spring connected to the stop member.

4. An apparatus, as set forth in claim 3, further comprising a holding element, said stop member and spring being connected to the holding element.

5. An apparatus, as set forth in claim 4, further comprising a spacer positioned between the stop member and holding element.

6. An apparatus, as set forth in claim 4, wherein the stop member and holding element are interchangeable, said stop member having a different thickness than the holding element.

7. An apparatus, as set forth in claim 4 further comprising a base connected to the holding element, said spring being positioned between the base and holding element.

8. An apparatus, as set forth in claim 7, further comprising a bolt connecting the holding element and base, said holding element being movable along the bolt toward and from the base.

9. An apparatus, as set forth in claim 8, wherein the spring is a coil spring, said bolt being positioned within the spring.

* * * * *